United States Patent Office 2,795,588
Patented June 11, 1957

2,795,588

PROCESS FOR PRODUCING COPPER-PHTHALO-CYANINE PRECURSOR

Melvin A. Perkins, Brandywine Hundred, Del., assignor to E. I. du Pont de Nemours and Company, Wilmington, Del., a corporation of Delaware No Drawing. Application May 11, 1956,
Serial No. 584,200

5 Claims. (Cl. 260—314.5)

This invention relates to a novel process for preparing copper-phthalocyanine precursor.

In copending application of Barnhart and Skiles, Serial No. 252,401 (now Patent No. 2,772,284), a novel, solvent-soluble complex compound is described which has no tinctorial qualities by itself, but which possesses the valuable property of yielding copper phthalocyanine upon heating or upon being treated with reducing agents. By virtue of this property, the compound may be used as a dyestuff for textile material, to be applied thereto from an alcoholic or aqueous-alcoholic bath and to be developed on the fiber by heating or reduction. The composition of this novel compound is indicated there as corresponding to a complex made up of 6 phthalonitrile units, one atom of copper and an extra NH unit. Accordingly, it may be represented by the formula $Cu(C_8H_4N_2)_6NH$, wherein the $C_8H_4N_2$ unit has the structural form

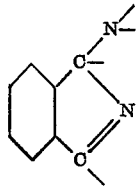

This novel complex compound has been designated in said application of Barnhart and Skiles as leuco-copper phthalocyanine. Subsequent usage however has adopted for it the name copper-phthalocyanine precursor. When this compound is converted into copper phthalocyanine by treatment with reducing agents, the remaining two $C_8H_4N_2$ units and the extra NH group are split off in the form of ammonia and phthalonitrile or other phthalic compounds resulting from the interaction of phthalonitrile, ammonia and the reducing medium.

According to said copending application Serial No. 252,401 (now Patent No. 2,772,284), as improved by the copending application of A. C. Stevenson, Serial No. 384,349 (now Patent No. 2,772,283), this complex compound is synthesized by reacting phthalonitrile, a cupric salt and ammonia at a temperature between 55° and 98° C. in a water-miscible, neutral organic solvent and in the presence of a catalyst, while feeding into the reaction mass diluted gaseous oxygen, for instance air or a mixture of air and ammonia.

In copending application of R. A. Brooks, Serial No. 332,513 (now Patent No. 2,772,285), the same or a closely similar copper-phthalocyanine precursor has been prepared by heating 1,3-diimino-isoindoline and a cupric salt (such as the chloride, bromide or sulfate) in an inert organic solvent at a temperature between 55° and 95° C.

As solvents for this purpose, the following organic liquids have been indicated: alcoholic solvents such as methanol or ethanol, the lower monoalkyl ethers of ethylene glycol (the "Cellosolves"); dimethyl formamide, nitrobenzene, o-dichlorobenzene or 1,2,4-trichlorobenzene. Best results are obtained by starting with essentially stoichiometric proportions, that is, about 6 moles of the diimino-isoindoline to each mole of cupric salt, but moderate variations, say up to 20% excess of either reactant, are permissible.

The reaction is believed to proceed along the lines indicated by the following equation:

$6C_8H_7N_3 + CuCl_2 \rightarrow Cu(C_8H_4N_2)_6NH + 3NH_3 + 2NH_4Cl$

I have now found that copper-phthalocyanine precursor can be prepared in excellent yield and purity according to the procedure of said Brooks application except employing as solvent an organic sulfoxide compound. As particular illustrations of such compounds may be named dimethyl sulfoxide, diethyl sulfoxide, methyl-ethyl sulfoxide, and tetramethylene sulfoxide. This result was unforeseen and constitutes a valuable practical discovery, because it has been recognized heretofore that the range of solvents applicable to the above reaction is limited essentially to those named in the aforementioned specification. For instance, pyridine, tetramethylene sulfone and acetone which are also water-soluble and which are generally considered as equivalent to the alcohols and "Cellosolves" for most practical purposes are decidedly inoperative in the synthesis of copper-phthalocyanine precursor.

Apart from this detail as to solvent, the synthesis in this invention may proceed according to any of the details set forth in the aforegoing Brooks application and may involve any of the variations indicated therein.

Thus, in lieu of 1,3-diimino-isoindoline itself, salts thereof may be employed, for instance the nitrate, provided a basic substance, e. g., sodium hydroxide, is added to liberate the free 1,3-diimino-isoindoline in the reaction mass.

The cupric salt may be anhydrous or hydrated and may be selected from the following group: cupric chloride or its dihydrate; cupric bromide; cupric sulfate and its monohydrate; cupric nitrate trihydrate; cupric acetate and its monohydrate. If an anhydrous salt is employed, the organic solvent may contain water up to 10% of its weight.

The reaction product may be isolated directly in amorphous form or it may be transformed into a moisture-stable, crystalline form by slurrying an aqueous filter cake of the same in methanol, then filtering off and drying at a temperature not exceeding 60° C. (Copending application of M. S. Whelen, Serial No. 423,278.)

Without limiting this invention, the following examples are given to illustrate my preferred mode of operation. Parts mentioned are by weight.

Example 1

A mixture of 12 parts of 1,3-diimino-isoindoline and 1.8 parts of anhydrous cupric chloride is added to 70 parts of dimethyl sulfoxide and the mixture is heated, with stirring, to 75° C. over 2 hours. The temperature is then raised to 91° over 1.5 hours and the reaction mass is filtered hot. The small amount of copper phthalocyanine on the filter is washed with dimethyl sulfoxide. The filtrate is drowned in water and the light tan solid formed is recovered by filtration. The solid is washed with water and dried to give an excellent yield of copper-phthalocyanine precursor.

The product can be applied to cellulosic fibers by the methods described in said Barnhart and Skiles application, Serial No. 252,401, or in the copending application of C. F. Miller, Serial No. 412,959, to produce fast, copper phthalocyanine blue shades.

Example 2

The procedure of Example 1 is repeated in all detail down to the point where the reaction mixture is filtered hot to remove copper phthalocyanine and the filter cake is washed with dimethyl sulfoxide. The combined filtrate and washings are then drowned in 1000 parts of water and the precipitated solid is recovered by filtration. The solid is washed with water and the filter cake is then slurried in an equal weight of methyl alcohol at room temperature for 1 hour. The solid is filtered off and dried at room temperature to give an excellent yield of the copper phthalocyanine precursor in crystalline form.

*Example 3*

Twelve and one-half parts of the nitrate of 1,3-diimino-isoindoline and 2.4 parts of sodium hydroxide are added to 150 parts of dimethyl sulfoxide, and the mixture is agitated for 1 hour at 20° to 30° C. 1.4 parts of cupric chloride are added to the agitated mixture which is then heated to 85° C. The temperature of the reaction mass is held between 85° C. and 90° C. for 45 minutes, ammonia being freely evolved. The mixture is then clarified by filtration and drowned in 1500 parts of cold water. The yellow-brown product which precipitated is filtered off, washed with water and dried at room temperature.

Reduction of this product with ascorbic acid in boiling ethylene glycol monoethyl ether gives pure copper phthalocyanine.

In lieu of dimethyl sulfoxide in the above examples, diethyl sulfoxide, ethyl-methyl sulfoxide or tetramethylene sulfoxide may be employed with equal success. In lieu of cupric chloride, any other cupric salt of the group above mentioned may be employed. Numerous other variations in detail will be readily apparent to those skilled in the art.

I claim as my invention:

1. A process for producing copper-phthalocyanine precursor, which comprises heating about 6 moles of 1,3-diimino-isoindoline with about 1 mole of a cupric salt, at a temperature between 55 and 95° C., in a water-miscible, neutral, organic liquid sulfoxide and recovering the alcohol-soluble reaction product.

2. A process as in claim 1, the solvent being an organic liquid sulfoxide selected from the group consisting of dimethyl sulfoxide, diethyl sulfoxide, methyl-ethyl sulfoxide and tetramethylene sulfoxide.

3. A process as in claim 2, the diimino-isoindoline compound being generated in situ from a salt thereof by the aid of an alkali-metal hydroxide.

4. A process as in claim 2, the reaction product being precipitated by drowning the reaction mass in water.

5. A process as in claim 2, recovery of the reaction product being effected by removing from the reaction mass insoluble impurities, drowning the resulting clear solution in water, then filtering, and converting the filter cake into a crystalline form by slurrying with methanol.

No references cited.